United States Patent [19]

Capitao, Jr. et al.

[11] Patent Number: 5,758,559
[45] Date of Patent: Jun. 2, 1998

[54] PLASTIC FILM CUTTER AND CARTON THEREFOR

[75] Inventors: Manuel Capitao, Jr., Bradford; Paul H. Hollenbeck, Andover, both of Mass.

[73] Assignee: AEP Industries, Inc., South Hackensack, N.J.

[21] Appl. No.: 412,013

[22] Filed: Mar. 28, 1995

[51] Int. Cl.⁶ .................................................. B26D 7/26
[52] U.S. Cl. .................. 83/614; 83/649; 403/375; 403/22; 403/260
[58] Field of Search ................... 83/649, 614, 175; 225/91, 48, 39; 403/375, 22, 260

[56] References Cited

U.S. PATENT DOCUMENTS

| | | |
|---|---|---|
| D. 347,345 | 5/1994 | Kaiser et al. |
| 2,250,236 | 7/1941 | Russell .................... 225/39 X |
| 2,420,460 | 5/1947 | Bowdoin et al. .................... 83/614 |
| 3,142,426 | 7/1964 | Busse .................... 83/649 X |
| 3,222,972 | 12/1965 | Fulton .................... 83/649 X |
| 3,688,625 | 9/1972 | Thomas et al. |
| 3,821,915 | 7/1974 | Larrable .................... 83/649 X |
| 3,981,215 | 9/1976 | Granger et al. |
| 4,197,774 | 4/1980 | Singh et al. .................... 83/614 X |
| 4,210,043 | 7/1980 | Urion et al. |
| 4,245,536 | 1/1981 | Urion . |
| 4,474,318 | 10/1984 | Perrin . |
| 4,754,674 | 7/1988 | Perlman . |
| 4,787,284 | 11/1988 | Chen . |
| 4,957,023 | 9/1990 | Chen .................... 83/649 X |
| 4,960,022 | 10/1990 | Chuang . |
| 5,025,692 | 6/1991 | Reynolds .................... 83/649 X |
| 5,036,740 | 8/1991 | Tsai . |
| 5,186,091 | 2/1993 | Wolf .................... 83/549 X |
| 5,243,890 | 9/1993 | Ober .................... 83/614 X |
| 5,292,046 | 3/1994 | Kaiser et al. |
| 5,398,576 | 3/1995 | Chiu .................... 83/649 X |

FOREIGN PATENT DOCUMENTS

| | | |
|---|---|---|
| 678401 | 1/1964 | Canada . |
| 270203 | 5/1927 | United Kingdom . |

*Primary Examiner*—Rinaldi I. Rada
*Assistant Examiner*—Boyer Ashley
*Attorney, Agent, or Firm*—Mathews, Collins, Shepherd & Gould

[57] ABSTRACT

A plastic film cutter for clamping to an upstanding edge of a carton housing a supply of plastic film. The film is pulled across the top of an elongated cutter body which has a groove to guide a sliding cutter. The lower portion of the cutter has a plurality of inverted "U" shaped clamps for fitting over the carton edge. At least one of the clamps has a projection on its inner surface to prevent the cutter from being used on cartons for which it is not intended, that is, cartons which do not have a corresponding cutout to receive the projection.

8 Claims, 1 Drawing Sheet

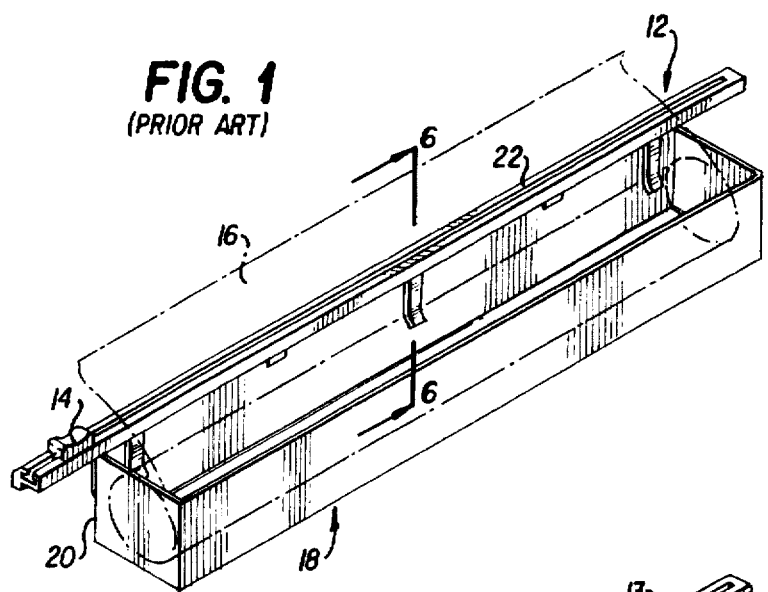
FIG. 1 (PRIOR ART)
FIG. 2
FIG. 3
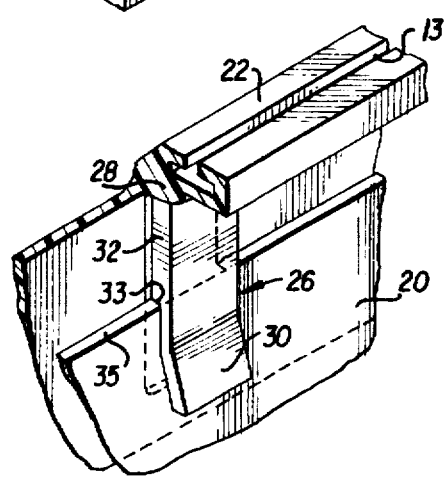
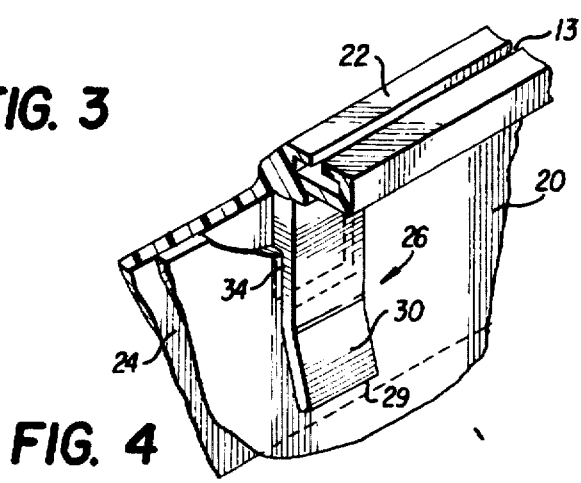
FIG. 4
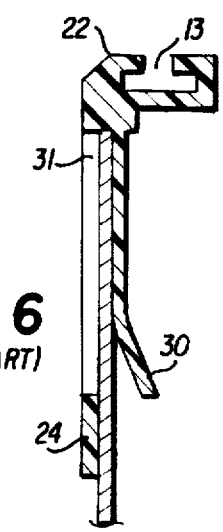
FIG. 6 (PRIOR ART)
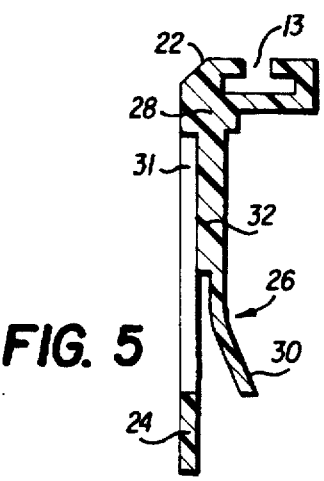
FIG. 5

PLASTIC FILM CUTTER AND CARTON THEREFOR

FIELD OF THE INVENTION

This invention relates to the field of plastic film cutters particularly suited for attachment to an upstanding edge of a carton housing a roll of plastic film and modification in the carton to receive the film cutter.

RELATED PRIOR ART

This invention is intended as an improvement on the plastic film cutter and carton disclosed in U.S. Pat. No. 4,960,022 to Chuang issued Oct. 2, 1990, the disclosure of which is hereby incorporated by reference.

BACKGROUND OF THE INVENTION

It is known from Chuang U.S. Pat. No. 4,960,022 to construct a plastic film cutter comprising an upper and lower portion, the lower portion being an elongated supporting board having a plurality of downwardly facing clamping plates projecting therefrom. The upper portion is a sliding furrow or groove for guiding a sliding cutting means. When this film cutter is clamped in place on the upstanding edge of corrugated carton housing a roll of plastic film to be cut, the film is pulled out of the box so as to lie on top of the film cutter so that the plastic film bridges across the groove or sliding furrow.

A sliding blade holder, preferably having a plurality of rollers on its underside, is positioned to slide along the groove or furrow and carries a cutter blade which projects downwardly into the groove or furrow. Thus the plastic film bridging the groove or furrow can be readily cut simply by moving the sliding blade holder along the groove with the blade cutting the film in its path.

The prior art film cutter described above works quite well when it is used on a film carton for which it is intended. The problem is that the Chuang film cutter has clamping means which enable a user to clamp the film cutter on any sort of corrugated cardboard box or carton, even one having a film of a different material or a different thickness for which the cutter is not intended to be used.

OBJECT OF THE INVENTION

In view of the above discussed difficulty it is an object of the present invention to construct a plastic film cutter which can only be successfully clamped on to cartons for which it is intended to be used, that is cartons which have cut out portions which correspond to projections within the clamping means. These projections will snugly interfit into properly positioned cutouts assisting to keep the cutter well fitted on the intended carton. To the contrary, when a user attempts to put the cutter on a carton for which the cutter is not intended, the projections within the clamping means will stop the user from obtaining any useful attachment to the box. Similarly the carton is made so that a plastic film cutter, which is not intended for use thereon, will be difficult to attach to the the carton.

SUMMARY OF THE INVENTION

In the plastic film cutter of the present invention there are a plurality of inverted "U" shaped clamping means projecting from an elongated supporting board and which face downwardly to fit over an upstanding edge of a box housing a roll of plastic film to be cut. Inside at least one of the "U" shaped clamping means there is a projection which is so positioned that the clamping means can only fit over and properly clamp on an upstanding carton edge which has at least one cut out of a size and shape and position to correspond with the size, shape and position of the at least one "U" shape clamping means having the projection.

BRIEF DESCRIPTION OF THE DRAWINGS

A more complete understanding of these and other features of the present invention will become apparent from a careful consideration of the following detailed description of certain embodiments illustrated in the accompanying drawings, in which like reference characters designate like or corresponding parts throughout the several views, and wherein:

FIG. 1 is a perspective view of a plastic film cutter according to the prior art wherein the film cutter can be indiscriminately attached to any carton edge;

FIG. 2 is a perspective view similar to FIG. 1 but showing a plastic film cutter according to the present invention wherein the film carton has an upstanding edge with a plurality of cutouts which correspond to projections within the clamping means of the film cutter;

FIG. 3 is a broken away partially sectional view showing the present invention when one attempts to put it on a carton edge not having the cutouts shown in FIG. 2;

FIG. 4 is a view similar to FIG. 3 but showing how the film cutter of the present invention will properly fit on a box edge for which it is intended;

FIG. 5 is a sectional view taken along line 5—5 of FIG. 2;

FIG. 6 is a sectional view taken along line 6—6 of FIG. 1.

DETAILED DESCRIPTION OF A PREFERRED EMBODIMENT

As shown in FIGS. 1 and 2, a plastic film cutter having an elongated body 12 housing a top groove or furrow 13 which supports a cutter blade slider 14. The slider 14 has a cutter blade (not shown) which projects downwardly into the groove 13 so that when a plastic film 16 is bridged across the groove 13 and the slider 14 is manually moved along the length of the groove, the film can be neatly cut by the blade. The plastic film is of a type which will readily cling to a surface which it contacts, such as the top surfaces on each side of the groove 13.

The body 12 and the slider 14 are preferably made of heavy duty plastic material so that it is suitable for repeated uses for cutting the film in a large number of cartons. Thus the cutter, instead of being a permanent part of the carton, as is usually the case with a saw-toothed cutter, is a separate detachable part. Such detachable cutters may be separately sold or furnished to a customer who purchases a quantity of cartons of film from a supplier.

The cutter is of course designed to work efficiently with the particular type of film and that film is of course manufactured to suit specified uses such as to cover food containers, to package hardware or to cover shipping containers. If the wrong cutter is clamped on a box of film the user will usually not realize it until a quantity of film has been improperly cut or ruined, thus leading toward ill will for the supplier of the carton of film and/or the supplier of the cutter. Thus the interchangability of the present cutters among all types of film boxes is not necessarily desirable.

Turning now to FIGS. 2–5 which show the cutter of the present invention and a carton designed to accept the cutter, it can be seen that the upstanding wall 20 of the carton 18 has a plurality of cutouts 34 which are spaced apart the same distance as a plurality of clamping means 26. Although FIG. 2 illustrates an enclosure defined by four walls, fewer or more walls can be present.

Each of the clamping means 26 comprises an inverted "U" shaped body having a bight 28 and first and second legs 30. In a preferred embodiment the film cutter has an upper portion 22 with the groove 13 for the slider 14 and a lower portion in the form of a supporting board 24 which is parallel to and acts to reinforce the upstanding wall 20 when the cutter is clamped in place by means of legs 30. These legs 30 are preferably pressed out of the material of the supporting board, thus leaving an opening 31 (see FIGS. 5 and 6) directly behind the first leg 30. However, the first surface of the board 24 on each side of the opening 31 acts as an opposing or several leg or a frictional contact surface to very adequately hold the cutter in place on the upper edge 35 of upstanding wall 20.

In the prior art as shown in FIGS. 1 and 6 there is nothing to prevent the entire cutter, even after being clamped on the upstanding edge 35, from being moved longitudinally along the length of wall.

In the cutter of the present invention at least one of the clamping means 26 has, within the interior of the "U" shaped body, a projection 32. This projection may be formed either on the leg 30 or on the board 24; in either location its purpose is the same, to prevent the cutter from being clamped onto a wall unless that wall has a cutout 34 positioned under each projection 32.

As shown in FIG. 3, if a user improperly attempts to place the cutter of the present invention on the upstanding wall of a carton for which it is not intended (i.e., does not have cutouts 34) then the full depth of the clamp cannot be utilized and no effective clamping or attachment can be accomplished. Thus, as shown in FIG. 3, the lower edge 33 of the projection 32 will strike against the upper edge 35 of the wall 20 preventing any effective clamping from taking place.

On the other hand, as shown in FIG. 4, when there is a cutout of an appropriate size and position, then the projection 32 will be snugly received into the cutout 34 thus leading to a more effective clamping action than in the prior art because the cutter is also held by the projection against sidewise movement along the length of wall 20.

Although a rectangular shaped projection 32 is shown, it is contemplated that the projection could be of a different shape, e.g., triangular or semi-circular. Similarly, although the projection 32 is shown adjacent the bight 28 of the "U" shaped clamp, it is contemplated that the projection 32 could be spaced away from the bight so as to be close to the distal end 29 (FIG. 4) of the leg 30. In such case, the opening 34, instead of being a notch cut out from the upper edge 35 of wall 20, would instead be an opening through the wall 20 and surrounded by uncut material. In such a case, the lower edge 33 of the projection 32 could have an inclined ramp to facilitate riding up over the surface of the uncut material of the wall 20 before being seated in place by the resilient biasing of the leg 30.

In a preferred embodiment of the present invention, intended for attachment to a film carton 12 inches wide, the supporting wall 24 is 12 inches long and 1½ inches wide. There are three clamping means 26, each being ⅝ inches wide and 1¼ inches long. One clamping means 26 is centered on the wall 20 and the other two are spaced equidistant from each end of wall 20 with the center of each clamping means being about 1⅛ inches from the wall end. Each projection 32 is a ⅝ inch square.

In the upstanding carton wall 20 there are three cutouts 34 each being a ⅝ inch square so as to define a close interference fit with the projections 32. In embodiments intended for wider cartons the dimensions are enlarged but the proportions remain similar, e.g., in an 18 inch long embodiment one clamping means 26 is centered and the other two clamping means are each positioned about 2⅜ inches from the ends of wall 20.

We claim:

1. A plastic film cutter which is readily detachable from a carton comprising:

carton means for housing a supply of plastic film, said carton means having an upstanding wall adjacent to an exit opening in said carton means; said upstanding wall having two opposed outer surfaces;

an elongated body having (a) an upper portion for mounting a cutter blade for longitudinal movement along said upper portion and (b) a lower portion having a parallel elongated supporting board with clamping means for frictional engagement with said upstanding wall;

said clamping means comprising at least one inverted substantially "U" shaped clamp having (a) a bight and (b) first and second legs for frictional engagement on said two opposed outer surfaces of said upstanding wall;

means preventing said film cutter from being attached to a carton means which is not intended for such attachment comprising at least one projection on an inner surface of at least one of said first and second legs, said projection being located within said "U" shaped clamp, for alignment with at least one opening in said upstanding wall, said at least one inwardly facing projection and said at least one opening being so positioned that said at least one projection will engage in said at least one opening when said inverted "U" shaped clamp is mounted on an upstanding wall of said carton means which is intended to receive said film cutter but when said inverted "U" shaped clamp is mounted on an upstanding wall of said carton means which is not intended to receive said film cutter, no such engagement will occur.

2. The film cutter of claim 1 in which said at least one inwardly facing projection is adjacent the bight of said "U" shaped clamp and said opening is a notch extending from an upper edge of said upstanding wall.

3. The film cutter of claim 1 which comprises a plurality of discrete clamping means, and wherein said first leg is positioned outwardly of said supporting board a distal end of said first leg being bent away from said supporting board and said second leg is a portion of said supporting board.

4. The film cutter of claim 1 wherein said first leg is integral with said supporting board and is formed by displacing a portion of said supporting board by pressing said first leg from said supporting board.

5. A plastic film cutter which is readily detachable from a carton comprising:

an elongated body having (a) an upper portion for mounting a cutter blade for longitudinal movement along said upper portion and (b) a lower portion having a parallel elongated supporting board with clamping means for frictional engagement with an upstanding wall of a carton means intended for said engagement;

said clamping means comprising at least one inverted substantially "U" shaped clamp having (a) a bight and (b) first and second legs for frictional engagement on first and second opposed outer surfaces of an upstanding wall;

means for preventing said film cutter from being attached to a carton means which is not intended for such attachment comprising at least one projection on an inner surface of at least one of said first and second legs, said projection being located within said "U" shaped clamp, for alignment with at least one opening in said upstanding wall, said at least one inwardly facing projection and said at least one opening being so positioned that said at least one projection will engage in said at least one opening when said inverted "U" shaped clamp is mounted on said upstanding wall of a carton means which is intended to receive said film cutter but when said inverted "U" shaped clamp is mounted on an upstanding wall of a carton means which is not intended to receive said film cutter, no such engagement will occur.

6. The film cutter of claim 5 in which said at least one inwardly facing projection is adjacent the bight of said "U" shaped clamp and said opening is a notch extending from an upper edge of an upstanding wall.

7. The film cutter of claim 5 comprises a plurality of discrete clamping means, and wherein said first leg is positioned outwardly of said supporting board, a distal end of said first leg being bent away from said supporting board and said second leg is a portion of said supporting board.

8. The film cutter of claim 5 wherein said first leg is integral with said supporting board and is formed by displacing a portion of said supporting board by pressing said first leg from said supporting board.

* * * * *